(No Model.) 2 Sheets—Sheet 2.
A. BOWN.
TRICYCLE.
No. 294,753. Patented Mar. 11, 1884.
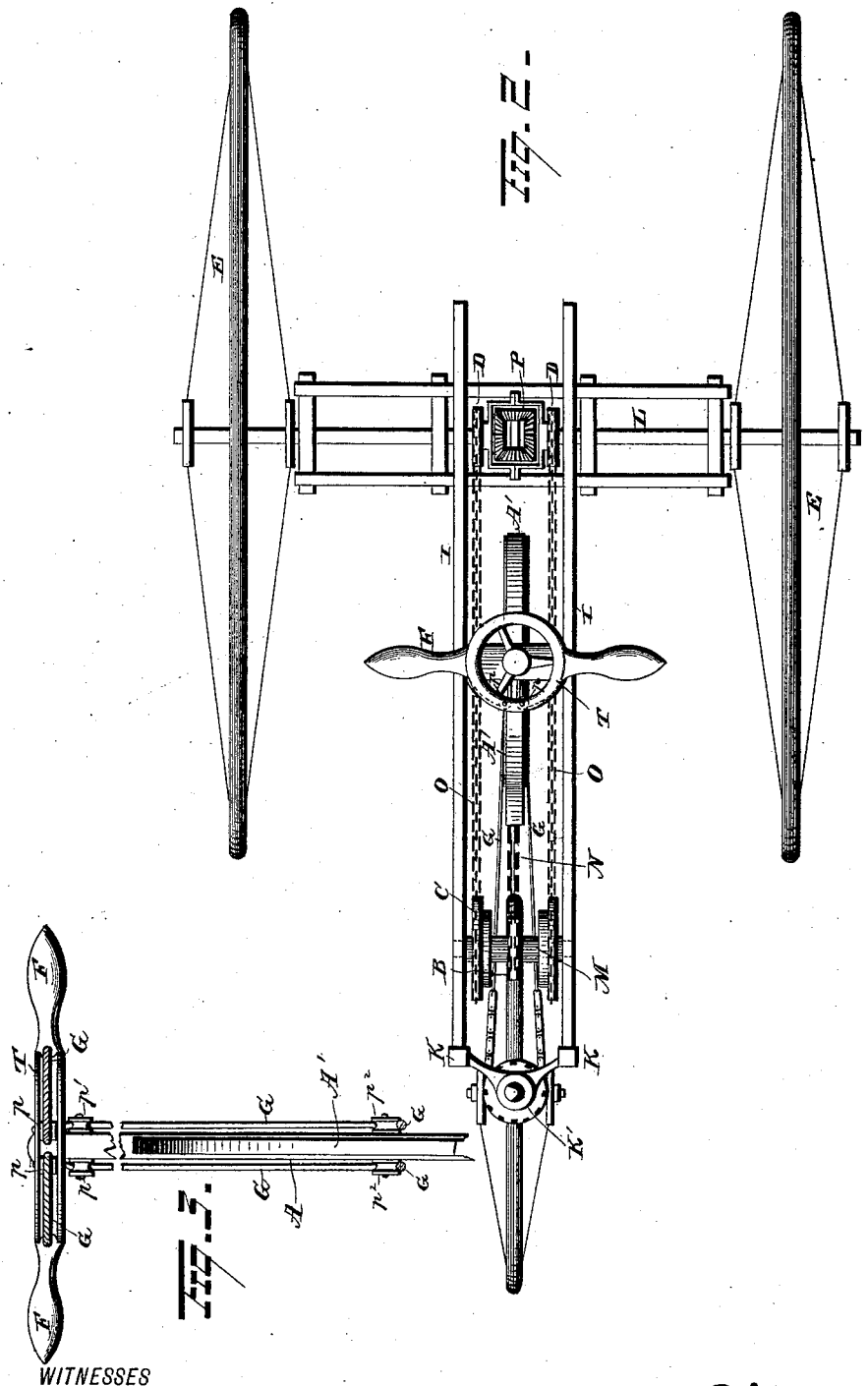
WITNESSES
S. G. Nottingham
George Cook
INVENTOR
Albert Bown,
By S. F. A. Symons
Attorney

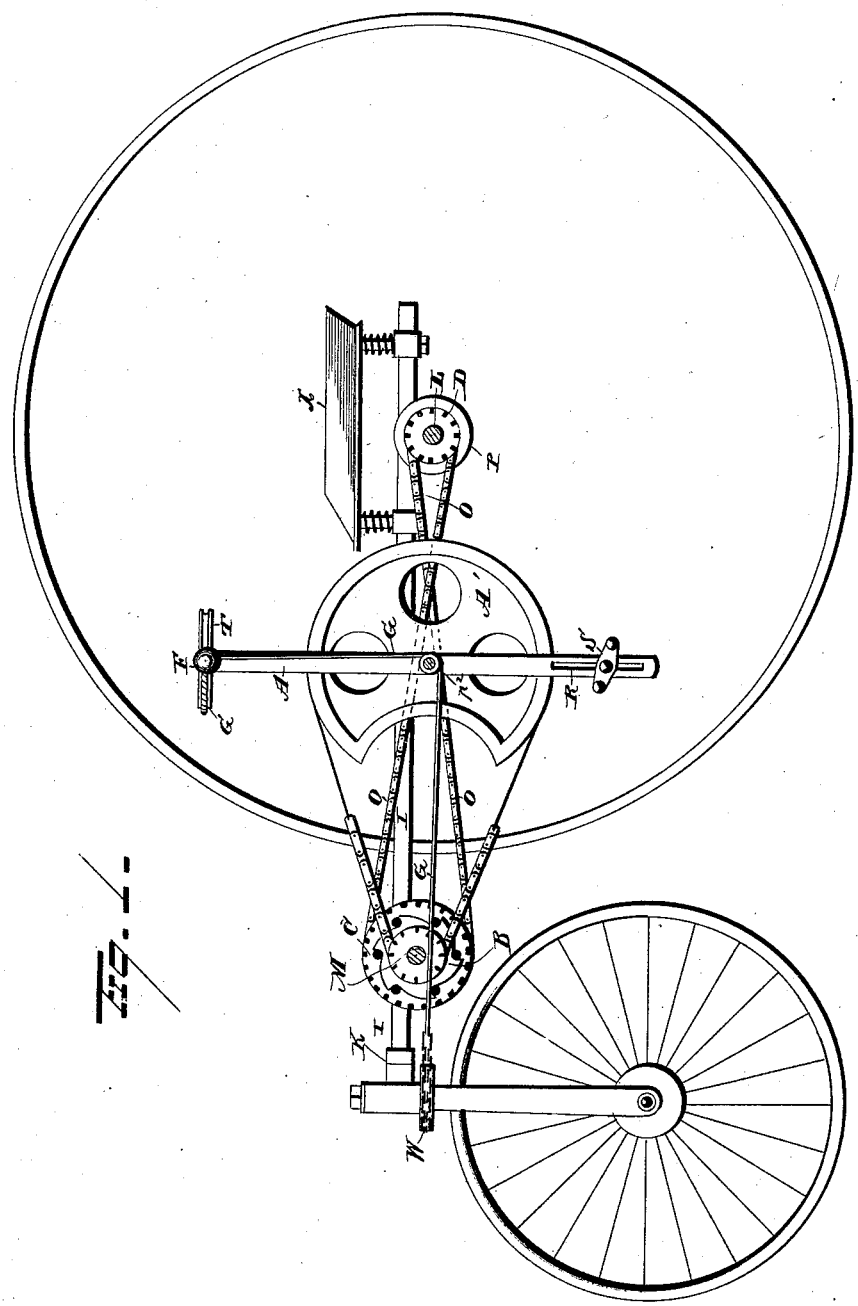

UNITED STATES PATENT OFFICE.

ALBERT BOWN, OF STREATOR, ILLINOIS.

TRICYCLE.

SPECIFICATION forming part of Letters Patent No. 294,753, dated March 11, 1884.

Application filed August 15, 1883. (No model.)

*To all whom it may concern:*

Be it known that I, ALBERT BOWN, of Streator, in the county of La Salle and State of Illinois, have invented certain new and useful Improvements in Tricycles; and I do hereby declare the following to be a full, clear, and exact description of the invention, such as will enable others skilled in the art to which it appertains to make and use the same.

My invention relates to an improvement in tricycles, the object being to provide means whereby the machine may be propelled by the arms instead of by the legs, as is ordinarily the case with machines now in common use.

A further object is to provide steering mechanism which may be operated without the necessity of releasing the hands or feet; further, to construct a machine of this character which shall be simple and economical in construction, and at the same time possess the qualities of efficiency and durability; and with these ends in view my invention consists in certain details of construction and combinations of parts, as will be hereinafter described, and pointed out in the claims.

In the accompanying drawings, Figure 1 is a view in side elevation of my improvement. Fig. 2 is a plan view thereof, and Fig. 3 is a detached view of the steering apparatus.

A represents an upright lever, secured to a cross-piece journaled in bearings secured to the frame I, to which lever is secured a disk, A', the front ends of said frame I being secured to a yoke, K, loosely secured to the front-wheel fork K', the rear portion of said frame being secured to the rear axle, L.

To the frame I, and near the forward end thereof, is secured the axle M, on which is mounted a pinion, B, around which passes a chain, N, the ends of which are connected to a belt passing around the disk A'. On the axle M are also secured the wheels C, provided with a clutch or ratchet, as shown in Fig. 1, around which wheels C are adapted to pass chains or belts O, connecting said wheels C with pinions D, secured to the rear axle, L, which latter is provided with a differential gear, P, adapted under all circumstances to evenly distribute the power to the two wheels E.

To the lower end of the upright lever A are secured the pedals S, said lever being provided with an elongated slot, R, adapting the said pedals to be raised or lowered to suit the length of the leg of the rider.

To the top of the lever is pivotally secured the double handle F, adapted to rotate on its center, immediately beneath which is secured a wheel or disk, T, provided with pulleys $p\,p\,p'\,p'$.

To each of the handles F is secured one end of the steering rope or wire G, which then passes around the pulleys $p\,p\,p'\,p'$ and around pulleys $p^2\,p^2$ at the center of the lever A, thence toward a pinion, W, secured to the fork of the front wheel, where a piece of chain is inserted and adapted to pass around the pinion W, and move said front or steering wheel with more precision.

Having described the construction of my improved machine, I will now set forth the mode of operation.

The rider, sitting in the seat X, oscillates the lever A by means of the handles F, his feet resting on the pedals S and aiding in the propulsion, if desired. The oscillation of this lever produces a corresponding motion in the disk A', which, by means of the chain and belt N, imparts its motion through the pinion B to the wheels C, which in turn impart their motion to the corresponding pinions, D, and to the wheels E. When the handles F are turned to the right or left, the ropes are drawn over the pulleys and produce a corresponding motion in the steering-wheel.

My invention is exceedingly simple in construction, is durable and efficient in use, and can be manufactured at a small initial cost.

It is evident that slight changes in the construction and arrangement of the different parts might be resorted to without departing from the spirit and scope of my invention, and hence I would have it understood that I do not limit myself to the exact construction shown and described, but consider myself at liberty to make such changes as fairly fall within the spirit and scope of my invention.

Having fully described my invention, what I claim as new, and desire to secure by Letters Patent, is—

1. In a tricycle, the combination, with a disk mounted on a frame, of an oscillating lever adapted to move said disk, a pinion connected to the disk by means of chains or belts, or both, and a wheel or wheels, C, connected to a suitable wheel or wheels on the rear axle by one or more endless chains, substantially as described.

2. In a tricycle, the combination, with a disk mounted on a frame, of an oscillating lever secured thereto, a pinion connected with the disk by a belt, chain, or both, and a clutch or clutches connected with pinions secured to the rear axle, substantially as set forth.

3. In a tricycle, the combination, with a disk loosely secured to a frame, the latter resting in the rear axle, of an oscillating lever secured thereto, a pinion secured to a shaft and connected with the disk, and clutches, also mounted on said shaft and connected by chains or equivalents to pinions secured to the rear axle, the latter provided with a differential gear, substantially as set forth.

4. In a tricycle, the combination, with a frame, the rear end resting on the rear axle, of a disk secured to a cross-piece journaled in bearings secured to the frame, a lever, also secured to said cross-piece, said lever provided with adjustable pedals, a pinion secured to a shaft and connected with the disk by a belt and chain, and clutches mounted on said shaft and connected by chains or equivalents with pinions secured to the rear axle, substantially as set forth.

5. In a tricycle, the combination, with an oscillating lever provided on its upper end with handles, and also near its center with rollers or pulleys, of a wheel or disk secured to the lever and provided with pulleys, and a rope and chain or equivalent secured to the handles and passing partly around the wheels and pulleys and around a pinion connected to the fork of the steering-wheel, substantially as set forth.

In testimony whereof I have signed this specification in the presence of two subscribing witnesses.

ALBERT BOWN.

Witnesses:
FAWCETT PLUMB,
GEO. GOULDING.